April 10, 1956    B. R. BAGLEY    2,741,134
STAMPED FABRICATED PULLEY
Filed March 17, 1952

Inventor
Bruce R. Bagley
Barthel + Bugbee
Attorneys

United States Patent Office 2,741,134
Patented Apr. 10, 1956

2,741,134

STAMPED FABRICATED PULLEY

Bruce R. Bagley, Detroit, Mich.

Application March 17, 1952, Serial No. 276,959

3 Claims. (Cl. 74—230.8)

This invention relates to pulleys and, in particular, to built-up or fabricated pulleys formed from sheet metal stampings.

One object of this invention is to provide a built-up pulley which is fabricated from telescoping or cup-shaped sheet metal stampings of inexpensive manufacture, yet which will possess adequate strength comparable to that of a cast metal pulley without the excessive weight and fragility thereof.

Another object is to provide a grooved built-up pulley of the foregoing character wherein the two sheet metal stampings which are combined to form the pulley are cup-shaped with the bottoms thereof substantially in engagement with one another to form a hub with a double thickness of metal, the peripheral portions of which are spaced away from one another with a slight gap at the turning point between the hub and the grooved periphery of the pulley so as to provide means for adjusting the width of the pulley groove to lie within close tolerances while maintaining the hub portions of the two pieces in contact with one another.

Another object is to provide a built-up pulley of the foregoing character as set forth in the preceding object wherein the groove is formed by oppositely-inclined flanges at the periphery of each cup-shaped stamping, thereby in assembly forming a V-grooved pulley.

Figure 1:
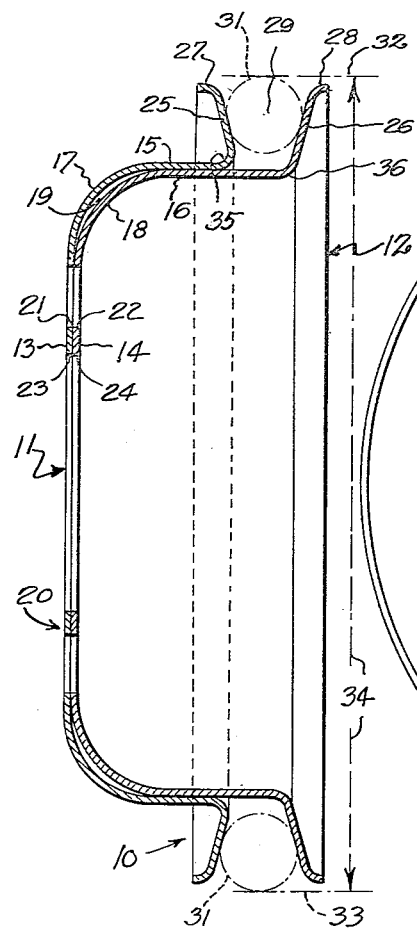
Figure 2:
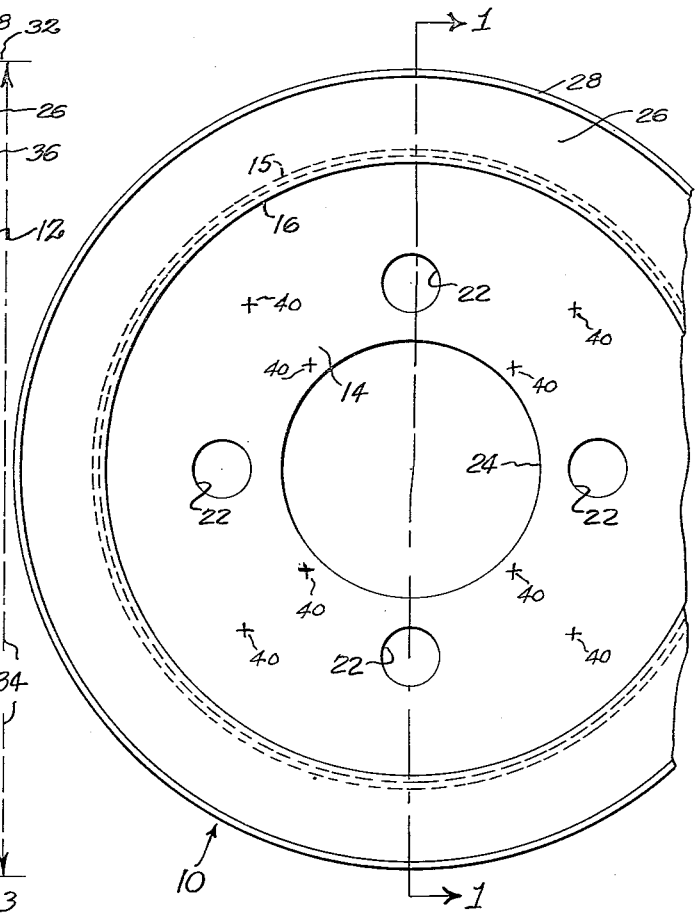

Other objects and advantages of the invention will become apparent during the course of the following description of the accompanying drawings, wherein:

Figure 1 is a central vertical section through a built-up pulley formed of cup-shaped stampings, taken along the line 1—1 in Figure 2, according to one form of the invention; and Figure 2 is a right-hand side elevation of the pulley shown in Figure 1.

Due to the weight, expense of machining, and fragility of cast metal grooved pulleys hitherto manufactured, particularly from cast iron, there has arisen a demand for an inexpensive fabricated or built-up pulley which will have sufficient strength without possessing the excessive weight and fragility of such cast pulleys. The present invention provides such a pulley, made up from a pair of cup-shaped stampings which telescope or nest within one another so that their bottoms engage one another in face-to-face contact to form the hub and the oppositely inclined rim flanges form the belt groove, whereas the arcuate or rounded portions between the bottoms and sides of the cup-shaped stampings are spaced slightly away from one another to form a gap, enabling the width of the belt groove to be kept within close tolerances while still maintaining the bottoms in contact with one another.

Referring to the drawings in detail, Figures 1 and 2 show a built-up or fabricated grooved pulley, generally designated 10, as assembled from two cup-shaped outer and inner sheet metal stampings 11 and 12, the central portions or bottoms 13 and 14 of which are disposed in contacting engagement with one another, whereas the sides or side portions 15 and 16 thereof while in contacting nesting engagement with one another, are joined to the bottom portions 13 and 14 by rounded annular edge portions 17 and 18 respectively. The edge portions 17 and 18 are of different radii of curvature, so as to form a gap 19 between them, providing for flexibility in manufacture and assembly while maintaining close tolerances, as explained below. The central portions 13 and 14 which form the bottoms of the cup-shaped members 11 and 12 in assembly constitute the hub portion, generally designated 20 and these are provided with aligned holes 21 and 22 respectively for the passage of the bolts by which the pulley 10 is secured to the rotary member of which it forms a part, such as to a disc on a shaft or to a fan, as in an automobile. The central portions 13 and 14 are likewise provided with central aligned holes 23 and 24 for the reception of the hub of the fan or for a shaft or other machine element upon which the pulley 10 is mounted.

The cup-shaped stampings 11 and 12 are provided with oppositely inclined annular peripheral flanges 25 and 26 with turned or rounded edges 27 and 28 respectively for additional strength, the side portions 15 and 16 being of sufficiently different depths to space the flanges 25 and 26 the proper distances from one another to provide a groove 29 therein for the reception of a conventional belt.

The groove 29 is so formed as to receive a conventional V-belt (not shown) and, to satisfy manufacturing requirements, the width of the groove 29 must be kept within narrow limits or tolerances. For this purpose, to measure the actual groove, balls 31 are placed at diametrically opposite points in the groove 29, and the diameter between the dash lines 32 and 33 as indicated by the dimension line 34 is thus determined by applying calipers thereto. The turning portions 35 and 36 between the side portions 15 and 16 and the flanges 25 and 26 respectively are rounded to strengthen the parts and prevent cracking under strain.

In assembling the built-up pulley 10, the cup-shaped stampings 11 and 12, which have been formed of such dimensions as to nest with one another in the manner stated above and shown in Figures 1 and 2, are placed one inside the other with their bottom portions 13 and 14 in connecting engagement and with their side portions 15 and 16 in telescoping or nesting engagement, as indicated in the annular zone 35, 36. The gaps 19 between the rounded portions 17 and 18 enable the flanges 25 and 26 to be moved slightly toward or away from one another while maintaining the hub portions 13 and 14 in engagement with one another, so that the assembly thereof may be welded, brazed, riveted or otherwise secured together while maintaining the width of the groove 29 between the inclined edge flanges 25 and 26 to close limits of dimensions.

In the operation of the invention, the fabricated or built-up pulley 10 as assembled above is secured to the rotary member, such as a fan hub, shaft or head on a shaft, by bolts passing through the holes 21, 22. A conventional V-belt is then trained around the groove 29 and connected to a correspondingly grooved pulley so as to drive the latter or be driven therefrom. The central portions 13 and 14 form a hub portion 20 of double thickness where the maximum strain on the pulley occurs, so that failure of the pulley due to the strain arising from the pull of the belt is prevented. At the same time, the cup-shaped construction imparts additional strength to the construction and the rounded corner portions 17 and 18 prevent the formation of sharp edges or indentations leading to the creation of cracks when placed under strain.

It will be understood that the pulley halves may be secured to one another by fasteners, by welding or in any other suitable manner. It is preferred, however, to assemble the pulley halves by means of a press fit between the portions 15 and 16. It has been found in practice that such a press fit, which causes engagement of the pulley halves in an annular zone at the locations 15, 16, gives a sufficiently tenacious grip between them to hold the pulley halves together under all normal operating conditions. In order to prevent relative sliding or slipping radially along the so-called neutral fiber or axis which here is the plane of junction between the central portions or bottoms 13 and 14 under extremely heavy loads, and permitted by the clearance space 19, the bottoms 13 and 14 may be secured to one another in any suitable way such as by spot-welding at, for example, the location indicated by the reference numerals 40.

What I claim is:

1. A stamped fabricated pulley comprising a pair of nesting outer and inner pulley halves cooperating with one another to form a single pulley, both of said pulley halves being cup-shaped, one pulley half being deeper than the other pulley half, the pulley halves having substantially disc-shaped central portions abuttingly engaging one another, a pair of substantially cylindrical marginal portions telescopingly engaging one another, a pair of annular rounded connecting portions respectively joining said central and marginal portions, and oppositely directed peripheral flanges on said marginal portions cooperatively forming the opposite side walls of a belt groove therebetween, each of said belt groove flanges being integral with and extending outwardly from its respective marginal portion, said rounded portions being spaced apart from one another with a clearance space therebetween.

2. A stamped fabricated pulley comprising a pair of nesting outer and inner pulley halves cooperating with one another to form a single pulley, both of said pulley halves being cup-shaped, one pulley half being deeper than the other pulley half, the pulley halves having substantially disc-shaped central portions abuttingly engaging one another, a pair of substantially cylindrical marginal portions telescopingly engaging one another, a pair of annular rounded connecting portions respectively joining said central and marginal portions, and oppositely directed peripheral flanges on said marginal portions cooperatively forming the opposite side walls of a belt groove therebetween, each of said belt groove flanges being integral with and extending outwardly from its respective marginal portion, said rounded portions being spaced apart from one another with a clearance space therebetween, said central portions being substantially flat and disposed substantially in face-to-face engagement.

3. A stamped fabricated pulley comprising a pair of nesting outer and inner pulley halves cooperating with one another to form a single pulley, both of said pulley halves being cup-shaped, one pulley half being deeper than the other pulley half, the pulley halves having substantially disc-shaped central portions abuttingly engaging one another, a pair of substantially cylindrical marginal portions telescopingly engaging one another, a pair of annular rounded connecting portions respectively joining said central and marginal portions, and oppositely directetd peripheral flanges on said marginal portions cooperatively forming the opposite side walls of a belt groove therebetween, each of said belt groove flanges being integral with and extending outwardly from its respective marginal portion, said rounded portions being spaced apart from one another with a clearance space therebetween, said central portions being substantially flat and disposed in substantially face-to-face engagement, said flanges being spaced apart from one another in an axial direction at their junctions with their respective marginal portions.

References Cited in the file of this patent

UNITED STATES PATENTS

| 1,700,416 | Nelson | Jan. 29, 1929 |
| 1,742,484 | Nelson | Jan. 7, 1930 |
| 1,756,592 | Harrison | Apr. 29, 1930 |
| 2,092,571 | Cole | Sept. 7, 1937 |
| 2,646,689 | Maher | July 28, 1953 |